July 11, 1939.    C. C. FARMER    2,165,999
FLUID PRESSURE BRAKE
Filed April 12, 1938
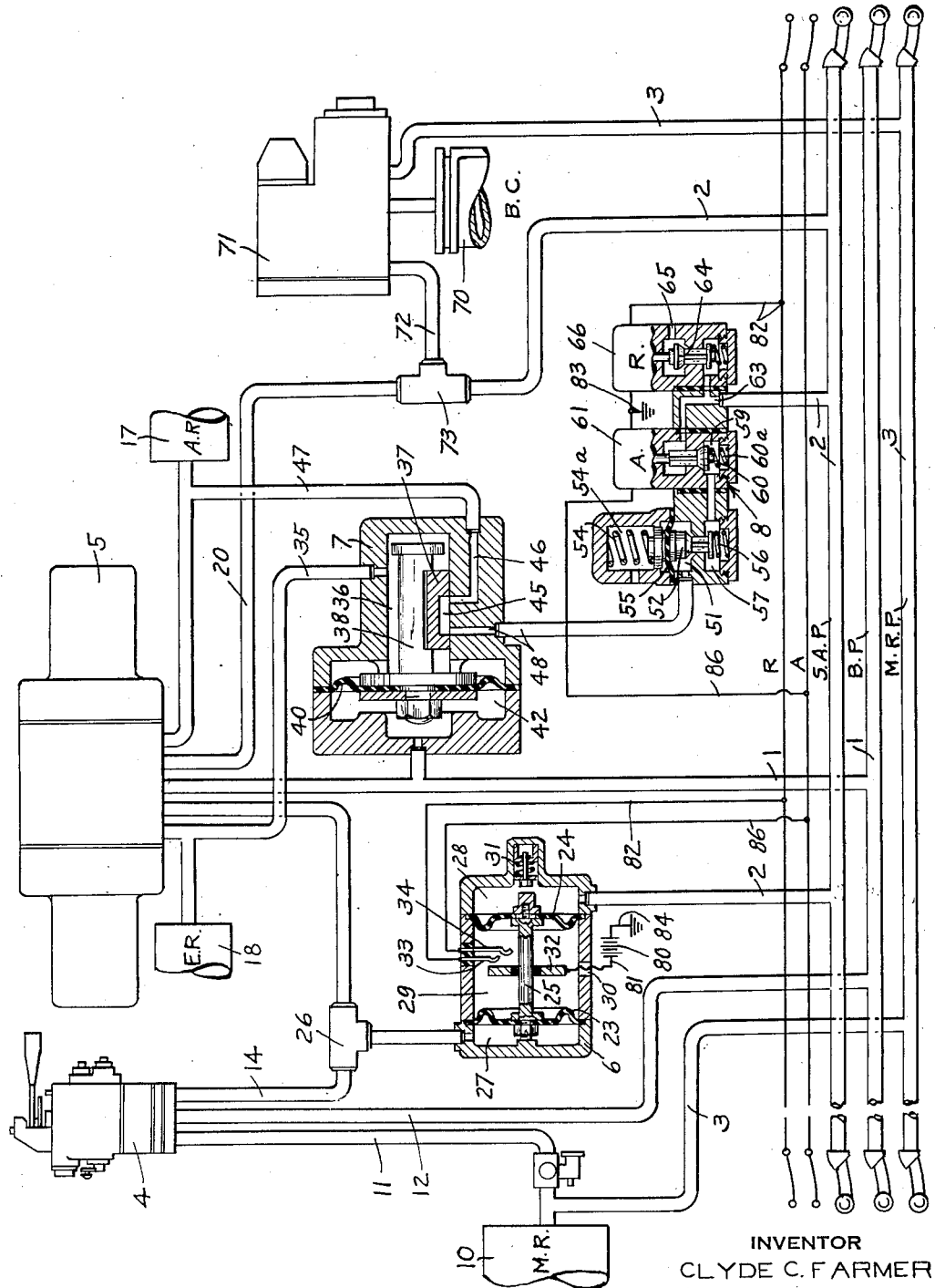
INVENTOR
CLYDE C. FARMER
BY
A. M. Higgins
ATTORNEY Patented July 11, 1939

2,165,999

UNITED STATES PATENT OFFICE 2,165,999

FLUID PRESSURE BRAKE

Clyde C. Farmer, Pittsburgh, Pa., assignor to The Westinghouse Air Brake Company, Wilmerding, Pa., a corporation of Pennsylvania Application April 12, 1938, Serial No. 201,519

7 Claims. (Cl. 303—15)

This invention relates to fluid pressure brakes, and more particularly to an electropneumatic brake equipment of the combined straight air and automatic type for high speed trains.

In one class of electropneumatic brake equipment designed for use on high speed trains, the brake apparatus includes electrically controlled means for effecting straight air applications of the brakes, in combination with automatic air brake means controlled by the pressure of fluid in a brake pipe for effecting so-called automatic applications of the brakes, as in the event of failure of the straight air portion of the apparatus. The apparatus for each unit of a train carrying the above type of brake equipment may comprise an electro-responsive valve device operative under normal conditions to supply fluid under pressure to the straight air pipe for effecting a straight air application of the brakes, and in addition a triple valve or control valve device having an equalizing service portion operative to effect an automatic application when the pressure of fluid in the usual brake pipe is reduced below that of fluid in the auxiliary reservoir. With this equipment it is intended that the brakes be controlled primarily by operation of the electro-responsive straight air apparatus, while the automatic air brake apparatus is always maintained available for operation when desired.

It has been proposed to utilize the auxiliary reservoir as the supply source from which the electro-responsive valve device is adapted to supply fluid under pressure to the straight air pipe in effecting a straight air application of the brakes. Since it is desired to maintain the automatic air brake function always available, however, there must be provided means which may be operated to cut off the supply of fluid under pressure from the auxiliary reservoir to the straight air pipe, so that if the straight air pipe should be broken of if the electro-responsive device should fail to operate properly, the pressure of fluid in the auxiliary reservoir will remain effective to move the automatic brake control valve device to brake application position without delay upon a subsequent reduction in brake pipe pressure.

One object of my invention is to provide a cut-off valve device adapted for association with a brake equipment of the above type and operative promptly in response to a reduction in brake pipe pressure to cut off communication between the auxiliary reservoir and the straight air pipe, thereby insuring operation of the automatic brake control valve device without delay.

Another object of the invention is to provide a cut-off valve device subject to the pressure of fluid in the brake pipe and to a substantially constant opposing fluid pressure and operative upon a reduction in brake pipe pressure to prevent flow of fluid under pressure from the auxiliary reservoir to the straight air pipe.

It is a further object of my invention to provide, in combination with electro-responsive valve means for establishing communication from the auxiliary reservoir to the straight air pipe in an equipment of the above type, valve means operable by the pressure of fluid in an emergency reservoir and responding promptly to a reduction in brake pipe pressure to cut off said communication, together with valve means subject to auxiliary reservoir pressure and automatically operative to close said communication for preventing reduction in auxiliary reservoir pressure beyond a predetermined degree.

Other objects and advantages of the invention will appear in the following description thereof, taken with reference to the accompanying drawing, wherein the single figure is a diagrammatic view of a fluid pressure brake equipment embodying the invention, the essential elements in which are shown in section.

Referring to the drawing, the equipment illustrated is designed primarily for a locomotive, although it will be understood that certain of the control devices, including that embodying the invention, may also form part of the apparatus carried on each car in the train. On the locomotive the brake equipment comprises a brake pipe 1, a straight air pipe 2 and a supply pipe 3, all of which are adapted to extend throughout the train, and further comprises a brake valve device 4, a brake controlling valve device 5, a master controller 6, and according to the invention, a cut off valve device 7, associated with a straight air magnet valve device 8.

The brake valve device 4 may be of a suitable type, such as that shown and described in the Patent No. 2,106,483 issued to Ellis E. Hewitt on January 25, 1938, and is adapted to be conditioned for either straight air operation or automatic operation. In release position, the brake valve device 4 is operative to supply fluid under pressure from the usual main reservoir 10 and by way of pipes 11 and 12 to the brake pipe 1. When conditioned for straight air operation and moved to a position in the service application zone, the brake valve device is operable to supply fluid from the main reservoir 10 to a pipe 14 at a pressure dependent upon the extent of movement of the brake valve handle, and in emergency position is in addition operable to vent fluid under pressure from the brake pipe 1 at an emergency rate. When conditioned for automatic operation, the brake valve device 4 is operable to vent fluid under pressure from the brake pipe 1 in accordance with the desired degree of application of the brakes.

The brake controlling valve device 5 is preferably of the type shown and described in the copending application of Ellis E. Hewitt and Donald L. McNeal, Serial No. 160,562, filed August 24, 1937, and although illustrated in the drawing in outline form will be understood to include service valve means operative when the brakes are in release position to supply fluid under pressure from the brake pipe 1 for charging the usual auxiliary reservoir 17, and emergency valve means operative at the same time to effect charging of the emergency reservoir 18. As is fully explained in the aforementioned patent application of Hewitt and McNeal, the service valve means, not shown, of the brake controlling valve device 5 is subject to the opposing pressures of fluid in the auxiliary reservoir 17 and in the brake pipe 1, and is operative upon a service reduction in brake pipe pressure to effect the supply of fluid from the auxiliary reservoir to a brake cylinder control pipe 20. The control valve device 5 further includes the emergency valve means, not shown, which is cooperative with the service valve portion in response to an emergency reduction in brake pipe pressure for effecting the supply of fluid from both the auxiliary reservoir 17 and the emergency reservoir 18 to the pipe 20.

The master controller 6 comprises a casing having mounted therein a pair of diaphragms 23 and 24, which are connected together by means of a rod 25. The diaphragm 23 is subject to the pressure of fluid that may be supplied by way of pipe 14 and a double check valve 26 to a chamber 27 formed in the casing, and the diaphragm 24 is subject to the opposing pressure of fluid in a chamber 28 communicating with the straight air pipe 2, the chamber 29 formed between the two diaphragms being open to the atmosphere through a passage 30. Yielding stop means including a spring 31 is disposed in the chamber 28 in operative alignment with the end of the rod 25. Secured to the rod 25 is a suitably insulated contact member 32, which is adapted, when moved with the rod and diaphragms toward the right as viewed in the drawing, to engage a stationary contact member 33 and a contact member 34 for closing a circuit to effect energization of the magnets in the magnet valve device 8, as hereinafter explained.

According to the invention, the cut-off valve device 7 comprises a casing having a valve chamber 36 within which is mounted a slide valve 37, which is operatively connected through the medium of a stem 38 with a flexible diaphragm 40. The diaphragm 40 is interposed between the valve chamber 36 and a chamber 42 communicating with the brake pipe 1, and is adapted by reason of its inherent resiliency normally to maintain the slide valve 37 in the position shown in the drawing, in which position of the valve a cavity 45 therein registers with a passage 46 connected through pipe 47 to the auxiliary reservoir 17, and with a passage 48 communicating with a pipe 49.

The magnet valve device 8, which includes a limiting valve portion and a release and supply magnet valve portion, comprises a casing having a diaphragm chamber 51 communicating with the pipe 49 and containing a limiting or cut-off valve 52, which is urged toward seated position by the force of a spring 54 acting through the medium of a diaphragm 55, the upper surface of which is subject to atmospheric pressure. The spring 54 preferably exerts such force as will effect seating of the valve 52 only when the pressure of fluid acting on the lower side of the diaphragm 55 is reduced to a degree slightly below the pressure of equalization of auxiliary reservoir pressure with that of the brake cylinder, or in the present case the equivalent relay valve pressure. Fluid at auxiliary reservoir pressure acting in chamber 51 on the diaphragm 55 is thus normally effective to counteract the force of the spring 54 for permitting the limiting valve 52 to be maintained unseated by a relatively light spring 56, which is disposed in a chamber 57 communicating with chamber 51 and with a valve chamber 59 formed in the casing. Mounted in the chamber 59 is a normally seated supply valve 60, which is operable upon energization of a magnet 61 to establish communication from the chamber 57 through a passage 63 to the straight air pipe 2. A normally unseated release valve 64 is provided for controlling communication from the passage 62 and the straight air pipe to an atmospheric opening 65, this valve being movable to seated position upon energization of a magnet 66 as hereinafter explained.

In order to insure rapid supply of fluid under pressure to the usual brake cylinder 70 for effecting an application of the brakes, there is provided a relay valve device 71, which may be of the type disclosed in U. S. Patent 2,096,491 issued to Ellis E. Hewitt on October 19, 1937, and is operative to supply fluid under pressure directly from the supply pipe 3 to the brake cylinder 70 in response to an increase in pressure of fluid in a pipe 72, which is adapted to communicate by way of a double check valve device 73 with either the pipe 20 or the straight air pipe 2.

*Operation*

In operation, with the brake valve device 4 in release position, fluid under pressure is supplied from the main reservoir 10 by way of the pipe 11, the brake valve device and the pipe 12 to the brake pipe 1, and thence to the chamber 42 of the cut-off valve device 7, the diaphragm 40 being thereby operated to move the slide valve 37 to the normal position, as shown in the drawing. Fluid from the brake pipe 1 also flows to the brake controlling valve device 5, which is thereby operated in the well known manner to effect charging of the emergency reservoir 18 and of the auxiliary reservoir 17 with fluid under pressure.

Fluid under pressure thus supplied to the emergency reservoir 8 also flows through the pipe 35 to the valve chamber 36 of the cut-off valve device 7. With the pressure of fluid on opposite sides of the diaphragm 40 thus substantially equal, the diaphragm and the slide valve 37 controlled thereby remain in the normal position as illustrated in the drawing, so that communication is maintained from the auxiliary reservoir 17 through the pipe 47, passage 46, cavity 45 in the slide valve, and passage and pipe 48 to the valve chamber 51 of the magnet valve device 8. As already explained, the diaphragm 55 is adapted to be held in its uppermost position by fluid under the pressure normally maintained in the auxiliary reservoir, and the spring 56 is thus permitted to hold the limiting valve 52 in unseated position as shown in the drawing.

At the same time, with the brake valve device 4 in release position, the pipe 14 and the chamber 27 of the master controller are connected with the atmosphere by way of suitable passages formed in the brake valve device. With the chamber 27 thus vented to the atmosphere, the diaphragm 23 and the contact member 32 associated therewith are maintained in the normal position as shown in the drawing, so that the circuits for the magnets 61 and 66 in the magnet valve device are open. With the magnets deenergized, the supply valve 60 is maintained in seated position, while the release valve 64 is held in unseated position for connecting the straight air pipe 2 to the atmosphere.

As hereinbefore explained, the brake valve device 4 is of the type adapted to be conditioned for either straight air operation or automatic operation. Assuming that the brake valve device 4 is conditioned for straight air operation, a service application of the brake may be initiated by moving the brake valve device into the service zone in the usual manner. The brake valve device is thereby operated to supply fluid under pressure through the pipe 14 and past the double check valve 26 to the chamber 27 of the master controller 6, the degree of fluid pressure thus built up in the chamber 27 being determined by the extent of movement of the brake valve handle. It will be understood that when the brake valve device 4 is thus operated to effect a straight air application of the brakes, the pressure of fluid in the pipe 12 and in the brake pipe 1 connected thereto is not changed. The pressure of fluid acting in the chamber 27 against the diaphragm 23 quickly moves the diaphragm and the rod 25 and contact member 32 associated therewith toward the right-hand, the contact member being thereby brought into engagement first with the stationary contact member 33 and then with the contact member 34.

Upon engagement of the contact member 32 with the contact member 33, a circuit is closed for energizing the magnet 66 of the magnet valve device 8, the circuit including a source of electrical energy such as the battery 80, a conductor 81, the contact members 32 and 33, a conductor 82, the magnet 66, a grounded conductor 83, and a similarly grounded conductor 84 connected to the battery. When the movable contact member 32 is brought into engagement with the contact member 34, a parallel circuit is established for energizing the magnet 61 in the magnet valve device 8, which circuit comprises the battery 80 and contact members 32 and 34, a conductor 86, the magnet 61, and grounded conductors 83 and 84. With the release valve 64 thus moved to seated position and the supply valve 60 to unseated position, fluid under pressure is supplied from the auxiliary reservoir 17 by way of the pipe 47, passage 46 in the cut-off valve device 7, the cavity 45 in the slide valve, the passage and pipe 48, past the unseated limiting valve 52 and supply valve 60 and through the passage 63 to the straight air pipe 2. Fluid under pressure flows from the straight air pipe 2 past the double check valve 73 and through the pipe 72 to the relay valve device 71, which is thereby operated to supply fluid under pressure from the supply pipe 3 to the brake cylinder 70 for effecting an application of the brakes. Fluid under pressure from the straight air pipe 2 is at the same time supplied to the chamber 28 of the master controller 6, and when the fluid pressure acting on the diaphragm 24 is approximately equal to the opposing pressure of fluid acting in the chamber 27 against the diaphragm 23, spring 31 shifts the diaphragms and the rod 25 to the left for breaking the contact between members 32 and 34 while holding contacts 32 and 33 in engagement. The circuit through which current has been supplied to the magnet 61 is thus opened and with the magnet 61 deenergized, the supply valve 60 is returned to seated position by the force of the spring 60a for cutting off further supply of fluid under pressure to the straight air pipe 2. The brakes are thus held applied to the degree determined by the positioning of the brake valve device 4.

When it is desired to effect the release of the brakes, the brake valve device 4 is moved to release position for venting fluid under pressure from the pipe 14 and the chamber 27 of the master controller 6, and the pressure of fluid in the chamber 28 is then effective to move the diaphragm 24 and rod 25 to the left, thereby moving the contact member 32 out of engagement with the contact member 33. The magnet 66 of the magnet valve device 8 is thus deenergized for permitting movement of the release valve 64 to unseated position, and fluid under pressure then flows from the straight air pipe 2 to the atmosphere by way of the port 65. At the same time fluid under pressure is vented from the relay valve device 71 by way of the pipe 72 and the straight air pipe for effecting operation of the relay valve device to vent fluid from the brake cylinder 70.

Although under normal conditions a straight air application of the brakes may be effected in the manner just described, it is desirable to provide means whereby an automatic application of the brakes may be effected in the event of failure of the straight air portion of the brake apparatus, such as would be caused if the straight air pipe were to become broken or if the magnet valves were rendered inoperative.

Reduction in the pressure of fluid in the auxiliary reservoir 17 below a predetermined value is prevented, on the one hand, by automatic movement of the limiting valve 52 in the device 8 to seated position under the force of the spring 54, which will act to force the diaphragm 55 and the valve 52 downwardly in case auxiliary reservoir pressure in the chamber 51 is reduced slightly below the normal pressure of equalization of the auxiliary reservoir and brake cylinder volumes. It will thus be apparent that if a straight air application of the brakes is attempted after the straight air pipe has been accidentally broken, sufficient fluid under pressure will be retained in the auxiliary reservoir 17 to permit subsequent operation of the brake controlling valve device 5 to effect an automatic application of the brakes in response to a reduction in brake pipe pressure effected in the usual manner.

It is normally to be expected, however, that in the event of a broken straight air pipe or defective magnet valve portion, the engineer controlling the train will become aware of failure of the brakes to apply shortly after he has attempted to cause a straight air application of the brakes, and while the pressure of fluid in the auxiliary reservoir 17 is still substantially higher than the pressure to which the limiting valve diaphragm 55 and spring 54 in the magnet valve device 8 are responsive. In such case the engineer may act immediately to prevent further loss of fluid under pressure from the auxiliary reservoir without waiting for automatic operation of the limiting valve 52, by moving the brake valve device 4 to emergency position, thereby effecting a reduction in the pressure of fluid in the brake pipe 1 at an emergency rate.

The reduction at an emergency rate in the pressure of fluid in the brake pipe 1 and in the chamber 42 of the cut-off valve device 7 permits quick movement of the diaphragm 40 and the slide valve 37 operated thereby toward the left, under the pressure of fluid in the valve chamber 36, so that communication from the auxiliary reservoir 17 to the passage and pipe 48 and the atmosphere is cut off. The pressure of fluid thus retained in the auxiliary reservoir 17 is substantially greater than would be the case if loss of auxiliary reservoir fluid by way of the broken straight air pipe or defective magnet valve were allowed to continue until the diaphragm 55 moved the limiting valve 52 to seated position.

Meanwhile, the reduction in brake pipe pressure at an emergency rate is effective to cause operation of the emergency portion of the brake controlling valve device 5 to supply fluid under pressure from the emergency reservoir 18, together with fluid under pressure supplied from the auxiliary reservoir 17 by operation of the service valve portion, through the pipe 20 and past the double check valve 73 to the pipe 72 and relay valve device 71, which is thereby operated to supply fluid under pressure from the supply pipe 3 to the brake cylinder 70. It will be understood that the pressure of the fluid supplied to the brake cylinder 70 by operation of the relay valve device 71 will correspond to the pressure of equalization of the fluid from both the emergency reservoir 18 and the auxiliary reservoir 17. Since this pressure of equalization of emergency reservoir and auxiliary reservoir fluid is substantially greater than the pressure remaining in the chamber 42 of the cut-off valve device following the emergency reduction in brake pipe pressure, the cut-off valve device 7 will remain in cut-out position until the brakes are released.

From the foregoing it will be apparent that I have by my invention provided sensitive cut-out valve means controlling communication between the auxiliary reservoir and the straight air pipe in an air brake equipment of the type hereinbefore described, which cut-out valve means is adapted to be operated by the pressure of fluid in the emergency reservoir, which of course remains fully charged during a straight air application of the brakes, in order to insure that undesired loss of fluid under pressure from the auxiliary reservoir by way of a broken straight air pipe or defective magnet valve will be stopped instantly upon the initiation of an automatic brake application.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake equipment of the combined straight air and automatic type, in combination, brake cylinder means, an auxiliary reservoir, a normally charged brake pipe, a brake controlling valve device operative on a reduction in pressure of fluid in said brake pipe to effect a supply of fluid under pressure to said brake cylinder means for effecting an automatic application of the brakes, a straight air pipe through which fluid under pressure may be supplied to effect supply of fluid under pressure to said brake cylinder means for effecting a straight air application of the brakes, electro-responsive means operable to establish communication from said auxiliary reservoir to said straight air pipe, a cut-off valve controlling said communication, a supplementary reservoir, and a movable abutment subject to the opposing pressures of fluid in said brake pipe and of fluid in said supplementary reservoir and operative promptly in response to a reduction in brake pipe pressure for actuating said valve to close said communication.

2. In a fluid pressure brake equipment of the combined straight air and automatic type, in combination, brake cylinder means, an auxiliary reservoir, a normally charged brake pipe, a brake controlling valve device operative on a reduction in the pressure of fluid in said brake pipe to effect supply of fluid under pressure to said brake cylinder means for effecting an automatic application of the brakes, a straight air pipe through which fluid under pressure may be supplied to effect supply of fluid under pressure to said brake cylinder means for effecting a straight air application of the brakes, electrically controlled means operative to establish communication from said auxiliary reservoir to said straight air pipe, limiting valve means operative upon a predetermined reduction in the pressure of fluid in said auxiliary reservoir for cutting off communication therefrom to said straight air pipe, and cut-off valve means operative independently of said limiting valve means upon a reduction in the pressure of fluid in said brake pipe for closing said communication.

3. In a fluid pressure brake equipment of the combined straight air and automatic type, in combination, brake cylinder means, an auxiliary reservoir, a normally charged brake pipe, a brake controlling valve device operative on a reduction in the pressure of fluid in said brake pipe to effect supply of fluid under pressure to said brake cylinder means for effecting an automatic application of the brakes, a straight air pipe through which fluid under pressure may be supplied to effect supply of fluid under pressure to said brake cylinder means for effecting a straight air application of the brakes, electrically controlled means operative to establish communication from said auxiliary reservoir to said straight air pipe, limiting valve means operative upon a predetermined reduction in the pressure of fluid in said auxiliary reservoir for cutting off communication therefrom to said straight air pipe, and cut-off valve means subject to the pressure of fluid in said brake pipe and to a substantially constant opposing fluid pressure for also controlling said communication, said cut-off valve means being operative to cut off supply of fluid under pressure from said auxiliary reservoir to said straight air pipe upon a reduction in the pressure of fluid in said brake pipe and regardless of the pressure of fluid in said auxiliary reservoir.

4. In a fluid pressure brake equipment of the combined straight air and automatic type, in combination, brake cylinder means, an auxiliary reservoir, a normally charged brake pipe, a brake controlling valve device operative on a reduction in the pressure of fluid in said brake pipe to supply fluid under pressure to said brake cylinder means for effecting an automatic application of the brakes, a straight air pipe through which fluid under pressure may be supplied to effect a supply of fluid under pressure to said brake cylinder means for effecting a straight air application of the brakes, electro-responsive means operable to establish communication from said auxiliary reservoir to said straight air pipe, an emergency reservoir adapted to be normally maintained charged with fluid under pressure by said brake controlling valve device regardless of operation of said electro-responsive means, and a cut-off valve device comprising a valve controlling the communication between said auxiliary reservoir and said electro-responsive means, and a flexible diaphragm subject to the opposing pressures of fluid in said brake pipe and in said emergency reservoir, said diaphragm being responsive to the initial stage of a reduction in brake pipe pressure for quickly closing said valve, thereby to prevent subsequent supply of fluid under pressure from the auxiliary reservoir to the straight air pipe.

5. In a fluid pressure brake equipment of the combined straight air and automatic type, in combination, fluid pressure operated brake applying means, an auxiliary reservoir, a normally charged brake pipe, a brake controlling valve device operative on a reduction in pressure of fluid in said brake pipe to supply fluid under pressure from said auxiliary reservoir to said brake applying means for effecting an automatic application of the brakes, a straight air pipe through which fluid under pressure may be supplied to said brake applying means for effecting a straight air application of the brakes, electro-responsive means operable to establish communication from said auxiliary reservoir to said straight air pipe, a cut-off valve controlling said communication, a supplementary reservoir, and a movable abutment subject to the opposing pressures of fluid in said brake pipe and of fluid in said supplementary reservoir and operative promptly in response to a reduction in brake pipe pressure for actuating said valve to close said communication.

6. In a fluid pressure brake equipment of the combined straight air and automatic type, in combination, fluid pressure actuated brake applying means, an auxiliary reservoir, a normally charged brake pipe, a triple valve device operative on a reduction in the pressure of fluid in said brake pipe to supply fluid under pressure from said auxiliary reservoir to said brake applying means for effecting an automatic application of the brakes, a straight air pipe through which fluid under pressure may be supplied to said brake applying means for effecting a straight air application of the brakes, electrically controlled means operative to establish communication from said auxiliary reservoir to said straight air pipe, limiting valve means operative upon a predetermined reduction in the pressure of fluid in said auxiliary reservoir for cutting off communication therefrom to said straight air pipe, and cut-off valve means operative in response to a reduction in the pressure of fluid in said brake pipe for also cutting off said communication.

7. In a fluid pressure brake equipment of the combined straight air and automatic type, in combination, fluid pressure actuated brake applying means, an auxiliary reservoir, a normally charged brake pipe, a triple valve device operative on a reduction in the pressure of fluid in said brake pipe to supply fluid under pressure from said auxiliary reservoir to said brake applying means for effecting an automatic application of the brakes, a straight air pipe through which fluid under pressure may be supplied to said brake applying means for effecting a straight air application of the brakes, electrically controlled means operative to establish communication from said auxiliary reservoir to said straight air pipe, limiting valve means operative upon a predetermined reduction in the pressure of fluid in said auxiliary reservoir for cutting off communication therefrom to said straight air pipe, and cut-off valve means subject to the opposing pressures of fluid in said brake pipe and of fluid from a normally charged source, said cut-off valve means being operative upon a reduction in brake pipe pressure to cut-off communication between said auxiliary reservoir and said straight air pipe regardless of auxiliary reservoir pressure.

CLYDE C. FARMER.